United States Patent
Weber et al.

(10) Patent No.: US 9,568,305 B2
(45) Date of Patent: Feb. 14, 2017

(54) METHOD AND SYSTEM FOR MEASURING THE THICKNESS OF ICE ON A SURFACE, NOTABLY OF AN AIRCRAFT, USING A LUMINOUS PATTERN GENERATED BY DIFFUSION IN THE ICE

(71) Applicants: AIRBUS OPERATIONS (S.A.S.), Toulouse (FR); AIRBUS DEFENCE AND SPACE GMBH, Ottobrunn (DE)

(72) Inventors: Marc Marcel Weber, Toulouse (FR); François Antoine Olchewsky, Ramonville Saint Agne (FR); Ricardo Maiko Uehoka Entz, Munich (DE)

(73) Assignees: AIRBUS OPERATIONS (S.A.S.), Toulouse (FR); AIRBUS DEFENCE AND SPACE GMBH, Ottobrunn (DE)

(*) Notice: Subject to any disclaimer, the term of this patent is extended or adjusted under 35 U.S.C. 154(b) by 0 days.

(21) Appl. No.: 14/974,912

(22) Filed: Dec. 18, 2015

(65) Prior Publication Data
US 2016/0178352 A1    Jun. 23, 2016

(30) Foreign Application Priority Data
Dec. 19, 2014    (FR) .................................... 14 62936

(51) Int. Cl.
*G01B 11/06* (2006.01)
*G06T 11/60* (2006.01)
*H04N 5/235* (2006.01)
*B64D 15/20* (2006.01)

(52) U.S. Cl.
CPC ........... *G01B 11/0625* (2013.01); *B64D 15/20* (2013.01); *G06T 11/60* (2013.01); *H04N 5/2355* (2013.01)

(58) Field of Classification Search
CPC . G01B 11/0625; G01B 11/06; G01B 11/0675; G01N 21/314; G01N 21/3554; G01N 21/359; G01N 21/21; G01N 25/72
See application file for complete search history.

(56) References Cited

U.S. PATENT DOCUMENTS

| | | | | |
|---|---|---|---|---|
| 5,400,144 A * | 3/1995 | Gagnon | ................. | G01B 11/06 340/583 |
| 5,557,261 A * | 9/1996 | Barbour | ................. | G01N 21/21 244/134 F |
| 7,586,419 B2 | 9/2009 | Ikiades et al. | | |
| 8,102,542 B2 | 1/2012 | Gagnon | | |
| 2005/0167593 A1* | 8/2005 | Forsyth | ................ | G01N 21/314 250/339.11 |
| 2009/0222238 A1* | 9/2009 | Gagnon | ............. | G01B 11/0625 702/172 |

OTHER PUBLICATIONS

French Search Report for FR 14 62936 dated Aug. 8, 2015.

* cited by examiner

*Primary Examiner* — Michael P Stafira
(74) *Attorney, Agent, or Firm* — Jenkins, Wilson, Taylor & Hunt, P.A.

(57) ABSTRACT

A system and method for providing an estimate of the thickness of the ice regardless of the shape of its surface at the level of the air/ice interface. To this end the system and method measure an intensity profile of a luminous pattern generated by diffusion in the ice, which enables the system to measure the thickness of the ice even when the air/ice surface is not plane.

15 Claims, 3 Drawing Sheets

METHOD AND SYSTEM FOR MEASURING THE THICKNESS OF ICE ON A SURFACE, NOTABLY OF AN AIRCRAFT, USING A LUMINOUS PATTERN GENERATED BY DIFFUSION IN THE ICE

CROSS-REFERENCE TO RELATED APPLICATION

This application claims priority to French Patent Application FR 14 62936 filed Dec. 19, 2014, the entire disclosure of which is incorporated by reference herein.

TECHNICAL FIELD

The present disclosure concerns a system and a method for estimating a thickness of ice on a surface, in particular an aircraft surface.

BACKGROUND

It is known to evaluate and to monitor the quantity of ice on a surface of an aircraft, such as a wing, for example.

An optical system is used for this comprising a still camera and a laser. The beam from the laser passes through the ice and illuminates the surface of the aircraft at a central point. The light rays of the beam are then reflected in all directions from the central point and some of these reflected rays are refracted in contact with the ice/air interface with the result that they are again directed toward the surface of the aircraft so as then to form a refraction spot on the surface of the aircraft at a non-zero distance from the central point. The system then measures the distance between the refraction spot and the central point and obtains the depth of the ice by deducing it from the refraction angle of the ice.

However, for this method, based on the refraction of the rays at the air/ice interface and therefore on the angle of refraction of the ice, to be reliable, it is necessary for the ice surface to be plane. Indeed, any deformation of the air/ice interface leads to unpredictable refraction of the rays and therefore interferes with the measurement of the thickness of the ice. The surface of the ice being liable to assume various shapes on the surface of an aircraft, this method does not guarantee that it will be possible to measure the thickness of the ice on aircraft surfaces in all circumstances.

SUMMARY

The present disclosure provides an estimate of the thickness of the ice regardless of the shape of its surface at the level of the air/ice interface.

To this end the present disclosure concerns a system for measuring a thickness of ice on a surface, in particular of an aircraft, the system comprising:
  a light source configured to project a collimated beam onto the surface in such a manner as to generate a luminous pattern by diffusion in the ice;
  an imaging device configured to acquire an image of the ice including the luminous pattern;
  a measuring unit configured to measure on the image a luminous intensity profile of the luminous pattern; and
  a calculation unit configured to estimate the thickness of ice present on the surface as a function of the luminous intensity profile and from at least one predetermined table.

By measuring the intensity profile of the luminous pattern generated by diffusion, account is no longer taken of the refraction of the light rays at the air/ice interface in the ice but only of the direct diffusion of the light in the ice, which enables the system to measure the thickness of the ice even when the air/ice surface is not plane.

In accordance with various embodiments of the disclosure herein, separately or in combination:
  the light source has a wavelength between 200 nanometers and 1 micrometer inclusive;
  the light source is selected from:
    a laser;
    a pulsed light source;
    a light source emitting radiation outside the visible band;
    a light source emitting radiation at a plurality of wavelengths;
  the measuring unit is configured to measure a width of the intensity profile, the calculation unit being configured to estimate the thickness of ice as a function of the width of the intensity profile;
  the imaging device is configured for double image acquisition; and
  the imaging device is a high dynamic range imaging device.

The disclosure herein also concerns a method of measuring a thickness of ice on a surface, in particular of an aircraft, the method comprising:
  projecting a collimated light beam onto the surface in such a manner as to generate a luminous pattern by diffusion in the ice;
  acquiring an image of the ice including the luminous pattern;
  measuring on the image a luminous intensity profile of the luminous pattern; and
  estimating the thickness of ice present on the surface as a function of the luminous intensity profile and from at least one predetermined table.

In accordance with various embodiments of the disclosure herein, separately or in combination:
  the intensity profile is measured perpendicularly to the luminous pattern;
  the method comprises:
    measuring a width of the intensity profile; and
    estimating the thickness of ice as a function of the width of the intensity profile and from the predetermined table;
  the method comprises measuring the width at half the height of the intensity profile;
  the method comprises:
    acquiring a first sub-image of the ice when the light source is operating and a second sub-image of the ice when the light source is turned off;
    forming the image by superimposing the first and second sub-images.

The disclosure herein further concerns an aircraft, in particular a transport aircraft, including a system as described above.

BRIEF DESCRIPTION OF THE DRAWINGS

The appended figures show clearly how the disclosure herein may be carried out. In these figures, identical references designate similar elements.

DETAILED DESCRIPTION

Figure 1:
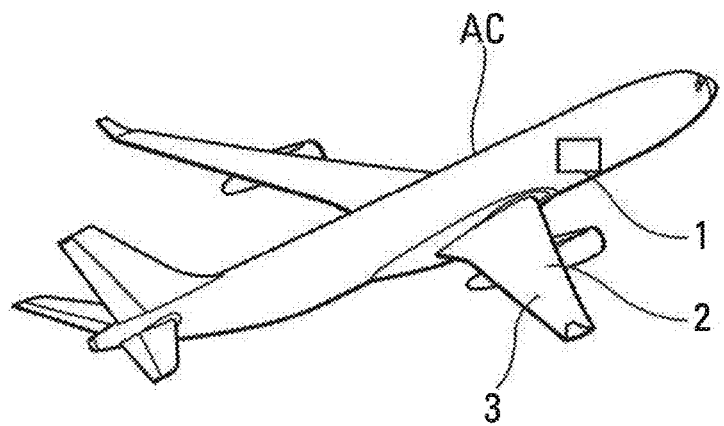
FIG. 1 is a diagrammatic perspective view of an aircraft including a system for measuring the thickness of ice on a surface of the aircraft.

FIG. 1 shows diagrammatically an aircraft AC, notably a transport aircraft, to which may be applied a system 1 for measuring the thickness of ice 2 on a surface 3 of the aircraft AC, for example a portion of a wing as shown in FIG. 1, a control surface, a leading edge slat, a flap, an aileron or any other part of the fuselage of the aircraft AC.

Figure 2:
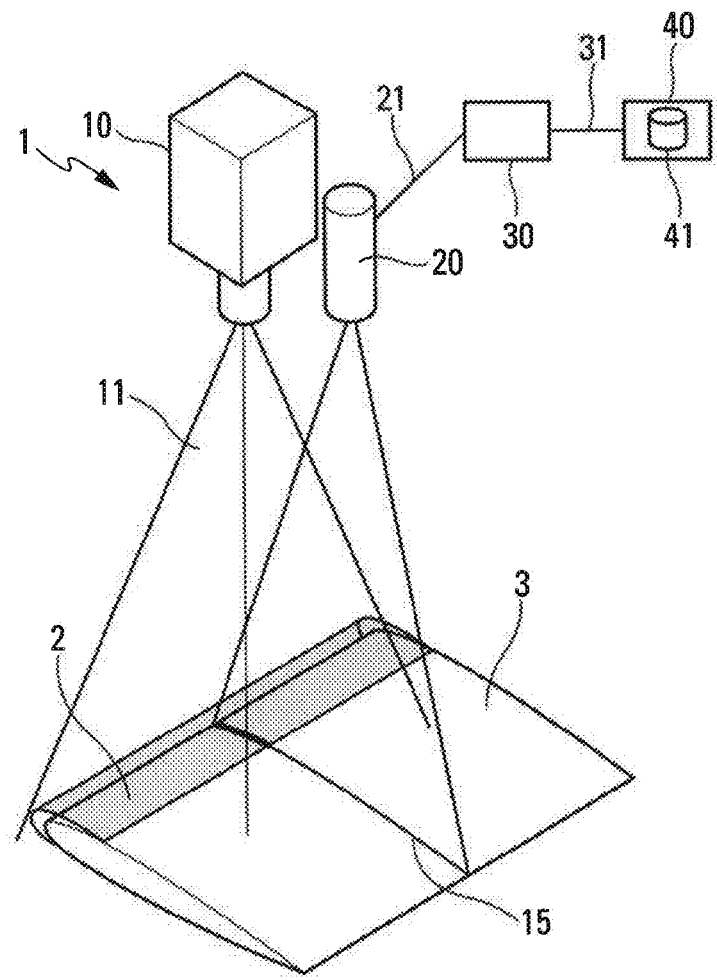
FIG. 2 is a diagrammatic perspective view of a system for measuring the thickness of the ice and a surface of an aircraft on which the ice the thickness of which is to be measured is present.
Figure 3:
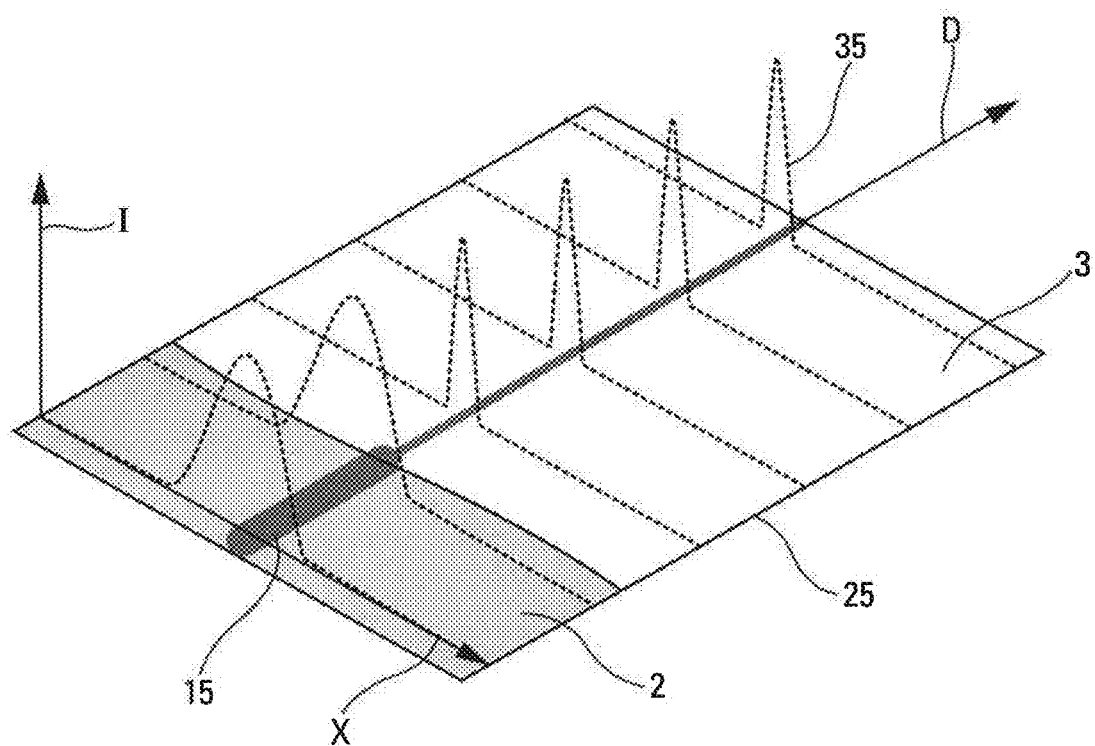
FIG. 3 is a perspective view of a surface on which ice is present and a luminous pattern generated by diffusion of light in the ice together with luminous intensity profiles of the luminous pattern.

The measuring system 1 in accordance with the disclosure herein (referred to hereinafter as the system 1) as shown by way of example in FIG. 2 includes:

a light source 10 configured to generate and project a collimated light beam 11 onto the surface 3 in such a manner as to generate a luminous pattern 15 by diffusion in the ice 2;

an imaging device 20 configured to acquire an image 25 (FIG. 3) of the ice 2 including the luminous pattern 15;

a measuring unit 30 configured to measure on the image 25 a profile 35 of luminous intensity of the luminous pattern 15, as shown in FIG. 3; and a calculation unit 40 configured to estimate the thickness of ice 2 present on the surface 3 as a function of the luminous intensity profile 35 and from at least one predetermined table.

For example, two predetermined tables are established as a function of the type of ice the thickness of which is measured.

For opaque ice, the cable is established using the following equations:

$$Z = 0.1 Wm^2 - Z0$$

$$Z0 = 0.1 Wm^2, 0$$

For transparent ice, the table is established using the following equations:

$$Z = 4.2 Wm^{\left(\frac{2}{3}\right)} - Z0$$

$$Z0 = 4.2 Wm, 0^{\left(\frac{2}{3}\right)}$$

In these equations:
Z is the thickness of the ice expressed in mm;
Wm is the width of the intensity profile 35; and
Wm,0 is the width of the intensity profile when the surface is free of ice.

The table is stored in a database 41 integrated into the calculation unit 40, for example.

The system 1 exploits the fact that, when the collimated beam 11 penetrates into the ice 2, a diffusion phenomenon occurs, causing the luminous pattern present in the ice 2 to differ from that which would have been created on a surface 3 of the aircraft AC free of ice.

By using the diffusion phenomenon and taking into account the predetermined table, the system 1 is able to measure submillimeter thicknesses of ice. It is furthermore possible to use for this purpose any type of collimated light source, and notably one of low cost.

By collimated beam is meant that the rays of this beam are parallel (or quasi-parallel) to one another.

The light source 10 generates a light beam having a wavelength between 200 nanometers and 1 micrometer inclusive. It is for example a laser, a pulsed light source, a light source emitting radiation outside the visible band or a light source utilizing numerous wavelengths.

The measuring unit 30 is connected to the imaging device 20 by a connection 21.

The calculation unit 40 is connected to the measuring unit 30 by a connection 31.

The imaging device is a still camera, for example. It acquires the images at a low frequency, notably of the order of 10 Hz.

The imaging device 20 is preferably of the double image acquisition type. In this case, it is configured to acquire a first sub-image of the ice 2 when the light source 10 is operating, i.e. a first sub-image in which the luminous pattern 15 is present, and a second sub-image of the ice 2 when the light source 10 is turned off, i.e. a second sub-image in which the luminous pattern 15 is absent.

The imaging device 20 includes an integrated processor element that is configured to form the image 25 on which the intensity profile 35 of the luminous pattern 15 is measured by superimposing the first sub-image and the second sub-image.

This superimposition makes it possible to eliminate the background noise that is amplified notably because the ambient lighting of the medium in which the images are acquired is irregular.

The imaging device 20 could equally include CMOS or CDD sensors and/or filters to limit or even eliminate the background noise.

In the example represented in FIG. 3, the luminous pattern 15 extends in an extension direction D. The intensity profile 35 of the luminous pattern 15 is obtained for a section perpendicular to the luminous pattern 15, i.e. perpendicular to the extension direction D. The luminous pattern 15 may take different forms. In particular, it may be formed from a point, a multitude of (non-aligned) points, a line as in FIG. 3 or a plurality of lines.

The measuring unit 30 is configured to measure a width L of the intensity profile 35. The calculation unit 40 is configured to estimate the thickness of the ice 2 as a function of the width L of the intensity profile 35 and from the predetermined table or tables.

The collimated beam 11 is projected onto the surface 3 which may, as shown in FIG. 3, include areas free of ice 2. The light pattern 15 is then more extensive in the ice 2 than in the portion of the surface free of ice, because of its diffusion in the ice. The intensity profile 35 of the luminous pattern 15 is therefore wider when the luminous pattern is generated in the ice 2 than when it is generated on a surface portion free of ice.

Figure 4:
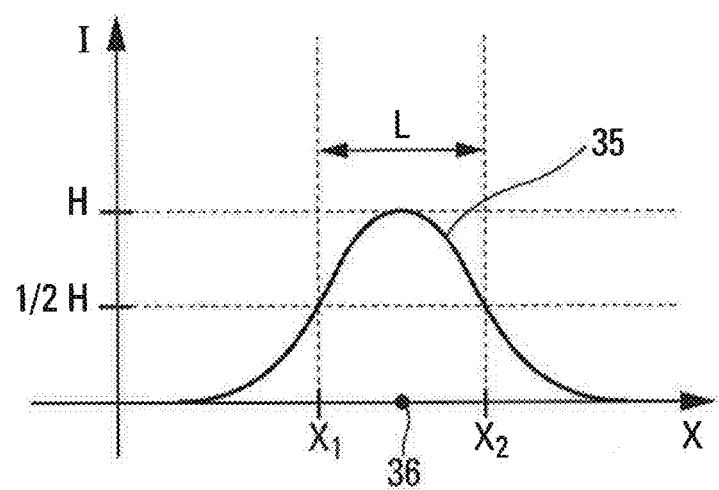
FIG. 4 represents, in graph form, one example of a luminous intensity profile of the luminous pattern.

As shown in FIG. 4, the intensity profile 35 is a curve (denoted f(x)) representing the intensity I of the luminous pattern 15 as a function of the location X at which the measurement is effected on the ice 2. The closer the measured value to the point 36 of penetration of the collimated beam 11 into the ice 2, the greater the luminous intensity I of the luminous pattern 15, which corresponds to the summit of the luminous intensity profile 35 indicated by the height H in FIG. 4. On the other hand, the farther the measured value from the point 36 of penetration of the collimated beam 11 into the ice 2, the lower the luminous intensity I of the luminous intensity profile 35, reducing to zero (at locations in the ice at which the light from the light source is not diffused).

The measuring unit 30 is configured to measure, in particular, a width L of the intensity profile 35 situated at half the height H of the intensity profile, i.e. at the level of an intensity value equal to half the maximum intensity H of the intensity profile 35.

The half-height width L is therefore measured at the level of the ordinate ½H in the example illustrated by FIG. 4 and corresponds to the distance between points X1 and X2.

This half-height width L is calculated with the intensity profile normalized between 0 and 1, i.e. the maximum height H of the intensity profile 35 is 1 and the half-height width L is calculated at a height equal to 0.5, using a method based on gradients to determine the coefficients b and c of the following equation:

$$f(x) = \exp\left(-\frac{1}{2}\left(\frac{x-b}{c}\right)^2\right).$$

The half-height width L is then given by the equation: $L = 2c\sqrt{2\ln 2}$.

The imaging device 20 may equally well be a high dynamic range (HDR) imaging device. Such a device makes it possible to improve the accuracy of the measurements in the event of saturation of the image.

Figure 5:
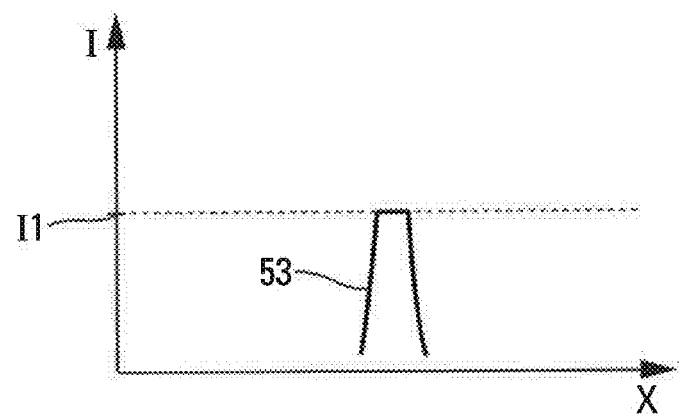
FIG. 5 represents, in graph form, a luminous intensity profile of the luminous pattern calculated over an overexposed sub-image.

The imaging device 20 acquires an overexposed image in such a manner as to detect a first portion 53 shown in FIG. 5 of the intensity profile 35 which is of low intensity. This image corresponds to the portion 53 of the intensity profile 35 that is below an intermediate intensity I1, this intermediate intensity I1 being below the maximum intensity H of the intensity profile 35.

Figure 6:
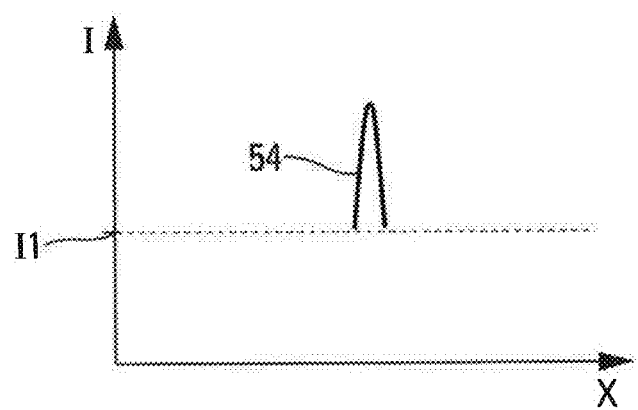
FIG. 6 represents, in graph form, a luminous intensity profile of the luminous pattern calculated over an underexposed sub-image.

The imaging device 20 also acquires an underexposed image in such a manner as to detect a second portion 54 shown in FIG. 6 of the intensity profile 35 which has a high intensity. This image corresponds to the portion 54 of the intensity profile 35 above the intermediate intensity I1 of the intensity profile 35.

Figure 7:
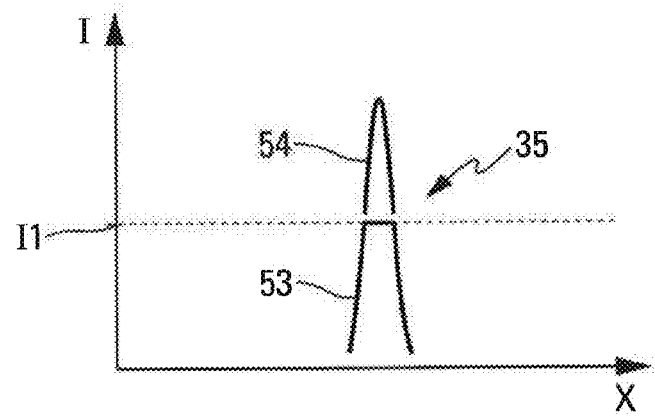
FIG. 7 represents, in graph form, the sum of the intensity profiles from FIGS. 5 and 6.

As shown in FIG. 7, the calculation unit then sums the first portion 53 and the second portion 54 with the aim of obtaining the entire intensity profile 35 making it possible to calculate the thickness of the ice.

By adding the first and second portions 53 and 54 respectively obtained by overexposure and underexposure, the imaging device 20 improves the accuracy of the intensity profile 35 and therefore the accuracy of the calculations of the thickness of the ice 2, notably in the event of saturation of the image.

Using the system 1, it is possible to choose freely the position of the imaging device 20 relative to that of the light source 10. However, in order to avoid the collimated beam 11 not penetrating the ice 2 or undergoing specular reflection, the position and the orientation of the light source 10 will be chosen in such a manner as to avoid the phenomenon of specular reflection.

The system 1 as described above makes it possible to calculate the thickness of any type of ice, including ice with a liquid portion.

It is important to note that it is not necessary to measure the time for the collimated beam to return to the light source. It is therefore possible to use an ordinary imaging device 20 of low cost.

The disclosure herein is described through the example of an aircraft, but may be applicable to any surface, notably of a mobile machine, in particular a flying machine, liable to experience icing.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present disclosure(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for measuring a thickness of ice on a surface of an aircraft, the system comprising:
   a light source configured to project a collimated beam onto the surface to generate a luminous pattern by diffusion in the ice;
   an imaging device configured to acquire an image of the ice including the luminous pattern;
   a measuring unit configured to measure on the image a luminous intensity profile of the luminous pattern, wherein the luminous intensity profile comprises a curve representing intensity of the luminous pattern as a function of a distance from a point of penetration of the collimated beam into the ice, and wherein the light source is oriented with respect to the surface so that the luminous intensity profile has a summit at the point of penetration; and
   a calculation unit configured to estimate the thickness of ice present on the surface as a function of the luminous intensity profile,
   wherein the measuring unit is configured to measure a width of the summit of the intensity profile and the calculation unit is configured to estimate the thickness of ice as a function of the width of the summit of the intensity profile and from at least one predetermined table.

2. The system as claimed in claim 1, wherein the light source has a wavelength between 200 nanometers and 1 micrometer inclusive.

3. The system as claimed in claim 1, wherein the light source comprises:
   a laser;
   a pulsed light source;
   a light source emitting radiation outside the visible band; or
   a light source emitting radiation at a plurality of wavelengths.

4. The system as claimed in claim 1, wherein the imaging device is configured for double image acquisition.

5. The system as claimed in claim 1, wherein the imaging device is a high dynamic range imaging device.

6. A method of measuring a thickness of ice on a surface, in particular of an aircraft, the method comprising:
   projecting a collimated light beam onto the surface in to generate a luminous pattern by diffusion in the ice;
   acquiring an image of the ice including the luminous pattern;
   measuring on the image a luminous intensity profile of the luminous pattern, wherein the luminous intensity profile comprises a curve representing intensity of the luminous pattern as a function of a distance from a point of penetration of the collimated beam into the ice, and wherein the light source is oriented with respect to the surface so that the luminous intensity profile has a summit at the point of penetration; and
   estimating the thickness of ice present on the surface as a function of the luminous intensity profile and from at least one predetermined table,
wherein:
   measuring the intensity profile comprises measuring a width of the summit of the intensity profile; and
   estimating the thickness of ice comprises estimating the thickness of ice as a function of the measured width of the summit of the intensity profile and from at least one predetermined table.

7. The method as claimed in claim 6, wherein the intensity profile is measured perpendicularly to the luminous pattern.

8. The method as claimed in claim 7, wherein the method comprises:
   measuring a width of the intensity profile; and
   estimating the thickness of ice as a function of the width of the intensity profile and from the predetermined table.

9. The method as claimed in claim 8, comprising measuring the width at half the height of the summit of the intensity profile.

10. The method as claimed in claim 9, wherein the method comprises:
    acquiring a first sub-image of the ice when the light source is operating and a second sub-image of the ice when the light source is turned off;
    forming the image by superimposing the first and second sub-images.

11. The system as claimed in claim 1, wherein the wherein the light source is oriented with respect to the surface so that the luminous intensity profile reduces monotonically from the summit at the point of penetration.

12. The system as claimed in claim 1, wherein the luminous pattern comprises a line extending in an extension direction, and wherein the intensity profile of the luminous pattern is obtained for a section perpendicular to the extension direction.

13. The system as claimed in claim 1, wherein the calculation unit is configured to estimate the thickness of ice from at least two predetermined tables established as a function of a type of ice, wherein the two predetermined tables comprise a first table for opaque ice and a second table for transparent ice.

14. The system as claimed in claim 1, wherein the at least one predetermined table is established using an ice-free width of an ice-free intensity profile for the surface.

15. The system as claimed in claim 1, wherein the position and orientation of the light source is configured to avoid a phenomenon of specular reflection.

* * * * *